United States Patent [19]
Pederson

[11] Patent Number: 5,372,092
[45] Date of Patent: Dec. 13, 1994

[54] COW AND CALF CATCHER AND HAULER ASSEMBLY

[76] Inventor: Wayne N. Pederson, R.R. 1, Box 152, Canby, Minn. 56220

[21] Appl. No.: 131,340

[22] Filed: Oct. 4, 1993

[51] Int. Cl.$^5$ .................................................. A01K 1/00
[52] U.S. Cl. .................................................. 119/20
[58] Field of Search ........................... 119/840, 843, 20

[56] References Cited

U.S. PATENT DOCUMENTS

| Re. 33,959 | 6/1992 | Mollhagen | 119/20 X |
| 2,263,069 | 11/1941 | Coyner | 119/20 X |
| 3,095,858 | 7/1963 | Bauer | 119/20 X |
| 3,545,407 | 12/1970 | Moore | 119/840 X |
| 3,931,796 | 1/1976 | Hoffman | 119/20 X |
| 4,201,157 | 5/1980 | Lambert | 119/20 X |
| 4,924,481 | 5/1990 | Bixler et al. | 119/20 X |

FOREIGN PATENT DOCUMENTS

| 1410659 | 10/1975 | United Kingdom | 119/20 |
| 626735 | 8/1978 | U.S.S.R. | 119/20 |

*Primary Examiner*—Robert P. Swiatek
*Attorney, Agent, or Firm*—John R. Flanagan

[57] ABSTRACT

A cow and calf catcher and hauler assembly includes an outer catcher pen, an inner platform and a cow chute and a calf pen. The outer catcher pen has a pair of opposite side walls and an end wall extending between and connected at opposite ends to the side walls for defining an openable and closable enclosed area. One of the side walls of the outer catcher pen is pivotally connected to one end of the end wall so as to function as an outside swingable gate adapted to undergo swinging movement between opened and closed positions relative to the other of the opposite side walls thereof. The inner platform is encompassed by the outer catcher pen and defines a confined area smaller in area than the enclosed area of the outer catcher pen. The cow chute and calf pen are disposed side-by-side one another and overlie the inner platform for respectively receiving a cow and calf in the chute and pen and on the platform. Also, the assembly includes an inside swingable gate disposed within the enclosed area of the outer catcher pen and pivotally attached to one of the chute and outer catcher pen and movable relative thereto for assisting in herding a cow from the enclosed area of the outer catcher pen into the chute and onto the platform.

20 Claims, 1 Drawing Sheet

U.S. Patent
Dec. 13, 1994
5,372,092
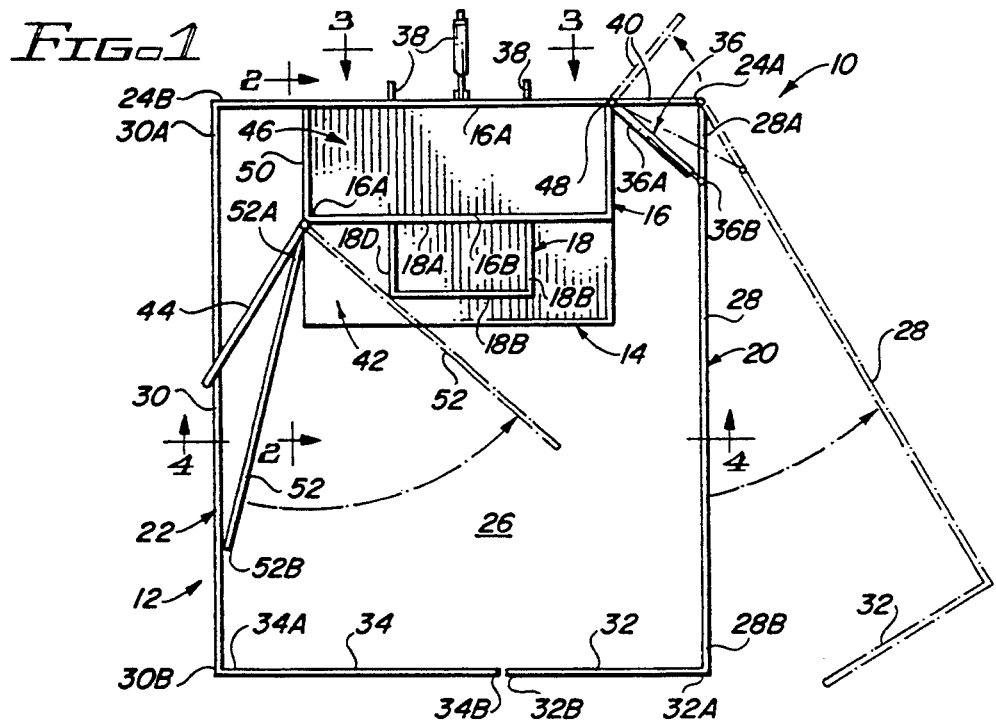
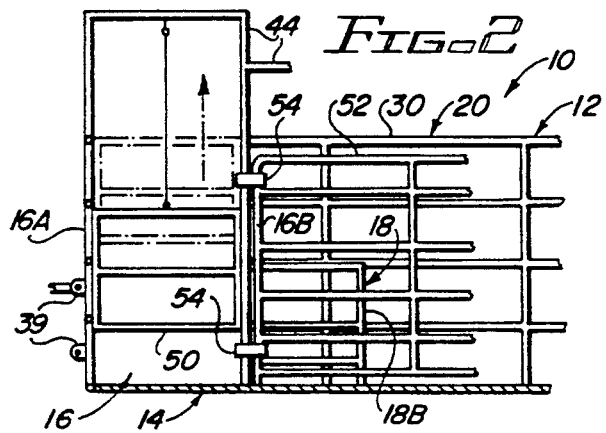
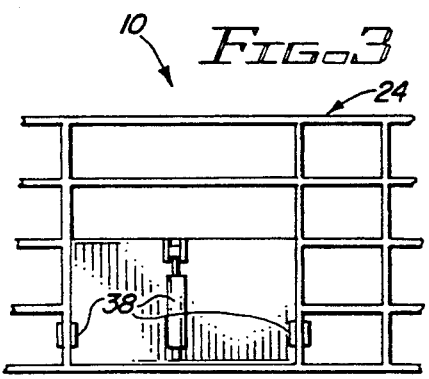
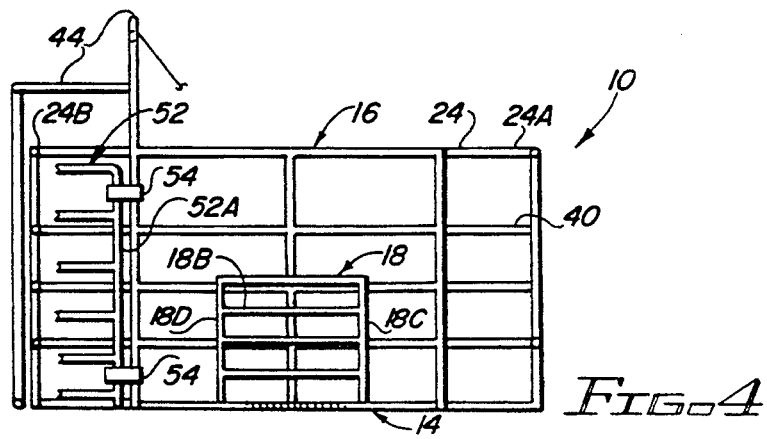

COW AND CALF CATCHER AND HAULER ASSEMBLY

BACKGROUND OF THE INVENTION

1. Field of the Invention

The present invention generally relates to livestock catch-carriers and, more particularly, concerned with a cow and calf catcher and hauler assembly.

2. Description of the Prior Art

In ranching and farming, it is often necessary to handle large animals such as horses or cattle for transport or medical treatment and the like. To meet such needs, a plurality of catch-carriers exhibiting a variety of features have been developed.

Representative examples of such types of catch-carriers are disclosed in U.S. Pat. Nos. to Bauer (3,095,858), Hoffman (3,931,796), Lambert (4,201,157) and Bixler et al (4,924,813). The Bauer and Hoffman catch-carriers provide vehicle-propelled front loading structures which are mounted ahead of the vehicle. The catch-carriers are used for enclosing cattle, horses, sheep and the like therein for transporting such animals from one location to another and to administer medical treatment or the like. The Lambert and Bixler et catch-carriers each provide loading chutes positioned rearwardly of the vehicle pulling them.

None of the above-described catch-carriers has features for enclosing both a cow and a calf for facilitating and initiating nursing of the cow by the calf soon after the birth of the calf. Initiation of such early nursing is crucial to the cow's claiming the calf as its own for the continual feeding thereof during the calf's formative months.

Consequently, a need exists for a catch-carrier which provides features for enclosing both a cow and a calf such that early nursing of the cow by the calf can be initiated. Such catch-carrier should be of simple design and construction for inexpensive manufacture and ease in use by the farmer or rancher.

SUMMARY OF THE INVENTION

The present invention provides a cow and calf catcher and hauler assembly designed to satisfy the aforementioned need by avoiding the drawbacks of the prior art without introducing other drawbacks. Instead, the cow and calf catcher and hauler assembly of the present invention provides expanded capabilities not available in the prior art devices.

One capability is the simplicity in design construction of the cow and calf catcher and hauler assembly for inexpensive manufacture and ease in use by the farmer or rancher. A second capability is the separate enclosure features for containing the cow and calf such that they can be transported as needed from one location to another with endangering the calf. A third capability is the detachability features of the calf pen and subpanel of the chute such that early nursing of the cow by the calf can be initiated in the field without first transporting the cow and calf to another location.

Accordingly, the present invention is directed to a cow and calf catcher and hauler assembly which comprises: (a) an outer catcher pen formed by a pair of opposite side walls and an end wall extending between and connected with the side walls so as to define an enclosed area, one of the opposite side walls defining means for assisting in herding a cow and a calf into and out of the enclosed area; (b) an inner platform defining a confined area substantially less in area than the enclosed area of the outer catcher pen; and (c) a cow chute and a calf pen disposed in side-by-side relationship and overlying and attached on the inner platform. The assembly further comprises means in the form of an inside swingable gate pivotally attached to one of the chute or outer-catcher pen for assisting in herding a cow from the enclosed area of the outer catcher pen into the confined area of the chute and onto the inner platform.

The end wall of the outer catcher pen is provided with a 3-point hitch hookup for attachment to a 3-point hitch extending rearwardly from a tractor. The cow and calf catcher and hauler assembly can thereby be readily transported by the tractor from one location to another. Also, the assembly includes an access door defined through one end portion of the end wall for permitting entry into and exit from the enclosed area of the outer catcher pen by the user.

Each of the opposite side walls of the outer catcher pen includes a main fence-like side panel and a supplementary fence-like end panel of lesser length than the main side panel and being attached to one end of the main side panel. The main side panel of one side wall is attached, preferably by being pivotally coupled, at the other end to one of the opposite ends of the end panel. Also, preferably, the supplementary end panel and the main side panel of each side wall are disposed in a substantially perpendicular relationship with one another.

The assembly also includes an actuator, such as a hydraulic cylinder, disposed between and attached at opposite ends adjacent to one end of the end panel and to one end of one of the main side panels. The actuator can be operated by the hydraulic system on the tractor or by any other suitable source of pressurized hydraulic fluid. The operation of the actuator through extension and retraction of its telescoping members permits the one side wall of the outer catcher pen to function as an outside swingable gate for opening and closing the outer catcher pen as a calf and a cow are separately herded into the enclosed area of the outer catcher pen.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top plan view of the cow and calf catcher and hauler assembly of the present invention, showing pivotal movement of outside and inside swinging gates and of an access door of the outer catcher pen.

FIG. 2 is a side elevational sectional view of the cow and calf catcher and hauler assembly of FIG. 1 taken along line 2—2, showing the vertically slidable movement of the rear end gate of the chute.

FIG. 3 is a front elevational fragmentary view the end wall of the outer catcher pen of FIG. 1, taken along line 3—3, showing a 3-point hitch hookup mounted on the end wall of the outer catcher pen.

FIG. 4 is a rear sectional view of the cow and calf catcher and hauler assembly of FIG. 1, taken along line 4—4.

DETAILED DESCRIPTION OF THE INVENTION

Referring to the drawings and particularly to FIG. 1, there is illustrated a cow and calf catcher and hauler assembly, generally designated 10, of the present invention. Basically, the catcher and hauler assembly 10 includes an outer catcher pen 12, an inner floor or platform 14, a cow stall or chute 16 and a calf pen 18. The outer catcher pen 12 of the assembly 14 is formed by a pair of opposite side walls 20, 22 and an end wall 24 extending between and connected with the side walls 20, 22 so as to define an enclosed area 26. The end wall 24 and each of the opposite side walls 20, 22 have a fence-like panel construction, namely, being constructed of rigidly connected rows and columns of rigid metal tubing.

Referring to FIGS. 1–4, each opposite side wall 20, 22 of the outer catcher pen 12 includes a main side panel 28, 30 and a supplementary end panel 32, 34. Each main side panel 28, 30 has a pair of opposite ends 28A, 28B and 30A, 30B and is attached at one end 28A, 30A to one of the opposite ends 24A, 24B of the end wall 24. Each supplementary end panel 32, 34 is attached at one end 32A, 34A to the other of the opposite ends 28B, 30B of the respective main side panel 28, 30. Also, each supplementary end panel 32, 34 is of lesser length than the one of the main side panels 28, 30 associated therewith. Preferably, the supplementary end panel 32, 34 and main side panel 28, 30 of each side wall 20, 22 are rigidly connected together in a substantially perpendicular relationship with one another.

The main side panel 28 of the one side wall 20 is attached, preferably by being pivotally coupled, at the other end 28A to the one opposite end 24A of the end panel 24. Thus, the one side wall 20 of the outer catcher pen 12 defines an outside swingable gate 20 movable between opened and closed positions relative to the other side wall 22. The outside swingable gate 20 provides a means for assisting in herding a cow and a calf into and out of the enclosed area 26. As depicted in FIG. 1, this outside swingable gate or the one side wall 20 extends substantially perpendicular to the end wall 24 when in the closed position. On the other hand, as also depicted in FIG. 2, this outside swingable gate or one side wall 20 extends at a substantially obtuse angle to the end wall 24 when in the opened position. Also, as seen in FIG. 1, in the closed position the terminal ends 32B, 34B of the supplemental end panels 32, 34 are disposed in contact with one another, while in the opened position there are spaced from one another.

Referring to FIG. 1, the assembly 10 also includes an actuator 36, such as a hydraulic cylinder 36, disposed between and attached at opposite ends adjacent to one end 24A of the end wall 24 and to the one end of the one side wall 20 or outside swingable gate 20. The actuator 36 can be coupled to and operated by the hydraulic system on the tractor or by any other suitable source of pressurized hydraulic fluid. The operation of the actuator 36 through extension and retraction of its telescoping members 36A, 36B moves the outside swingable gate or one side wall 20 of the outer catcher pen 12 between the opened and closed positions relative to the other side wall 22 thereof for opening and closing the outer catcher pen 12 as a calf and a cow are separately herded into the enclosed area 26 of the outer catcher pen 12.

Referring to FIGS. 1–3, the end wall 24 of the outer catcher pen 12 is provided with a 3-point hitch hookup 38 for attachment to a 3-point hitch extending rearwardly from a tractor. The cow and calf catcher and hauler assembly 10 can thereby be readily transported by the tractor from one location to another. Also, the assembly 10 includes an access door 40 defined in one end portion of the end wall 24 for permitting easy and convenient entry into and exit from the enclosed area 26 of the outer catcher pen 12 by the user.

Referring to FIGS. 1, 2 and 4, the inner platform 14 of the assembly 10, being preferably in the form of a solid flat floor, defines a confined area 42 which is substantially less in area than the enclosed area 26 of the outer catcher pen 12. The cow chute 16 and a calf pen 18 overlie and are attached upon the inner platform 14. Also, an overhead arch-like brace 44 is provided extending from a side of the inner platform 14 and a corner of the chute 16 to midway along the other side wall 22 of the outer catcher pen 12. The overhead brace 44 permits passage of the cow thereunder while providing lateral support for the other side wall 22 of the outer catcher pen 12 against impact by the cow at it moves toward the rear entry and exit end of the chute 16.

The cow stall or chute 16 of the assembly 10 includes a pair of opposite side panels 16A, 16B being laterally spaced apart and defining a central passageway 46 extending therethrough between a pair of opposite open front and rear ends 16C, 16D of the chute 16. The outer one of the opposite side panels 16A of the chute 16 is formed from a central portion of the end wall 24 of the outer catcher pen 12. The other inner one of the opposite side panels 16B of the chute 16 is in common with one wall of the plurality of walls 18A–18D of the calf pen 18. The respective walls of the chute 16 and pen 18 have fence-like panel constructions made of rigidly connected rows and columns of rigid metal tubing.

Also, the chute 16 includes a pair of opposite front and rear end gates 48, 50 being respectively disposed across the opposite front and rear ends 16C, 16D of the chute 16. The front end gate 48 is fixedly attached to the opposite side panels 16A, 16B of the chute 16 at the front end 16C thereof. The rear end gate 50 is coupled to the opposite side panels 16A, 16B of the chute 16 at the rear end 16D thereof and is vertically slidably movable upwardly and downwardly relative to the opposite side panels 16A, 16B. In such way, the rear end gate 50 moves between an opened position for permitting entry and exit of the cow to and from the chute 16 and a closed position for enclosing the cow within the chute 16.

Referring still to FIGS. 1, 2 and 4, the catcher and hauler assembly 20 further includes means in the form of an inside swingable gate 52. The inside gate 52 is disposed within the enclosed area 26 of the outer catcher pen 12. Further, the inside gate 52 is pivotally attached at one of its pair of opposite ends 52A by hinges 54 to one corner of the rear end of the chute 16 to undergo swinging movement relative thereto and to the outer catcher pen 12 between opened and closed positions, as respectively shown in broken and solid line forms in FIG. 1, for assisting in herding a cow from the enclosed area 26 of the outer catcher pen 12 into the chute 16 and onto the inner platform 14. More particularly, in the opened position the other opposite end 52B of the inside gate 52 is spaced from the other opposite side wall 22 of the outer catcher pen 12 whereas in the closed position the other opposite end 52B of the inside gate 52 is located adjacent to and in contact with the other opposite side wall 22 of the outer catcher pen 12. Thus, the inside gate 52 is adapted to undergo the swinging movement across the enclosed area 26 of the outer catcher pen 12 adjacent to but outside of the confined area 42 of the inner platform 14.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A cow and calf catcher and hauler assembly, comprising:
   (a) an outer catcher pen having a pair of opposite side walls and an end wall extending between and connected at opposite ends to said side walls for defining an enclosed area, said outer catcher pen also having means defined thereon for assisting in herding a cow into and out of said enclosed area;
   (b) an inner platform encompassed by said outer catcher pen and defining a confined area substantially smaller than said enclosed area of said outer catcher pen; and
   (c) a cow chute and calf pen disposed in side-by-side relationship and overlying said inner platform for respectively receiving a cow and calf in said chute and pen and on said platform so as to facilitate nursing of the cow by the calf and hauling the cow and calf to another location;
   (d) said herding assist means including one of said opposite side walls being pivotally connected to one end of said end wall so as to function as an outside swingable gate.

2. The assembly of claim 1 further comprising:
   an access door formed in said end wall of said catcher pen for permitting entry into and exit from said enclosed area by a user.

3. The assembly of claim 1 wherein said end wall and each of said opposite side walls have a fence-like panel construction.

4. The assembly of claim 1 wherein each of said opposite side walls includes:
   a main side panel having a pair of opposite ends and being attached at one end to one of said opposite ends of said end wall; and
   a supplementary end panel attached at one end to the other of said opposite ends of said main side panel.

5. The assembly of claim 4 wherein said main side panel and said supplementary end panel of each of said opposite side walls are rigidly attached together in a substantially perpendicular relationship to one another.

6. The assembly of claim 1 wherein said herding assist means also includes an actuator extending between and pivotally coupled at opposite ends with said one end of said end wall and one end of said one side wall, said actuator being operable for pivotally moving said one opposite side wall between closed and opened positions relative to the other of said opposite side walls.

7. The assembly of claim 6 wherein said one side wall extends substantially perpendicular to said end wall in said closed position of said one opposite side wall relative to said other opposite side wall.

8. The assembly of claim 6 wherein said one side wall extends at a substantially obtuse angle to said end wall in said opened position of said one opposite side wall relative to said other opposite side wall.

9. The assembly of claim 1 further comprising:
   a 3-point hitch hookup mounted on said end wall for attachment to a 3-point hitch of a tractor.

10. The assembly of claim 1 wherein said inner platform is a solid flat panel receiving and supporting said cow chute and calf pen thereon.

11. A cow and calf catcher and hauler assembly, comprising:
    (a) an outer catcher pen having a pair of opposite side walls and an end wall extending between and connected at opposite ends to said side walls for defining an enclosed area;
    (b) an inner platform encompassed by said outer catcher pen and defining a confined area substantially smaller than said enclosed area of said outer catcher pen; and
    (c) a cow chute and calf pen disposed in side-by-side relationship and overlying said inner platform for respectively receiving a cow and calf in said chute and pen and on said platform so as to facilitate nursing of the cow by the calf and hauling the cow and calf to another location;
    (d) said chute including a pair of opposite side panels being laterally spaced apart and defining a central passageway extending therethrough between a pair of opposite open front and rear ends of said chute, one of said opposite side panels of said chute being formed from a central portion of said end wall of said outer catcher pen, the other of said opposite side panels of said chute being in common with a wall of said calf pen.

12. The assembly of claim 11 wherein said herding assist means includes one of said opposite side walls being pivotally connected to one end of said end wall so as to function as an outside swingable gate.

13. The assembly of claim 11 wherein said chute also includes a pair of opposite front and rear end gates being respectively disposed at said opposite front and rear ends of said cow chute.

14. The assembly of claim 13 wherein said front end gate is fixedly attached to said opposite side panels of said cow chute at said front end thereof.

15. The assembly of claim 13 wherein said rear end gate is coupled to said opposite side panels of said cow chute at said rear end thereof and is vertically slidably movable upwardly and downwardly relative to said opposite side panels between an opened position for permitting entry and exit of a cow to and from said chute and a closed position for enclosing a cow within said chute.

16. A cow and calf catcher and hauler assembly, comprising:
    (a) an outer catcher pen having a pair of opposite side walls and an end wall extending between and connected at opposite ends to said side walls for defining an openable and closable enclosed area;
    (b) an inner platform encompassed by said outer catcher pen and defining a confined area substantially smaller than said enclosed area of said outer catcher pen;
    (c) a cow chute and calf pen disposed in side-by-side relationship and overlying said inner platform for respectively receiving a cow and calf in said chute and pen and on said platform so as to facilitate nursing of the cow by the calf and hauling the cow and calf to another location; and (d) inner means disposed within said enclosed area of said outer catcher pen and being pivotally attached to one of said chute and said outer catcher pen and movable relative thereto for assisting in herding a cow from said enclosed area of said outer catcher pen into said chute and onto said platform.

17. The assembly of claim 16 wherein said inner means is an inside swingable gate having a pair of opposite ends, said inside gate being pivotally attached at one of said opposite ends to said cow chute for undergoing swinging movement between an opened position in which said other of said opposite ends of said inside gate is spaced from one of said opposite side walls of said outer catcher pen and a closed position in which said other of said opposite ends of said inside gate is adjacent to said one opposite side wall of said outer catcher pen.

18. The assembly of claim 17 wherein said inside swingable gate undergoes said swinging movement across said enclosed area of said outer catcher pen and outside of said confined area of said platform.

19. The assembly of claim 16 further comprising:
an access door formed in said end wall of said catcher pen for permitting entry into and exit from said enclosed area by an user.

20. The assembly of claim 16 wherein one of said opposite side walls of said outer catcher pen is pivotally connected to one end of said end wall so as to function as an outside swingable gate adapted to undergo swinging movement between opened and closed positions relative to said other of said opposite side walls thereof.

* * * * *